(12) United States Patent
Smith et al.

(10) Patent No.: US 8,758,192 B2
(45) Date of Patent: Jun. 24, 2014

(54) CONTROL OF A POWERTRAIN FOR A HYBRID SYSTEM

(75) Inventors: Anthony L. Smith, Troy, MI (US); Hong Yang, Rochester Hills, MI (US); Norman K. Bucknor, Troy, MI (US); Yongsheng He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 13/227,613

(22) Filed: Sep. 8, 2011

(65) Prior Publication Data

US 2012/0083385 A1 Apr. 5, 2012

Related U.S. Application Data

(60) Provisional application No. 61/388,555, filed on Sep. 30, 2010.

(51) Int. Cl.
*B60W 20/00* (2006.01)
*B60W 10/08* (2006.01)

(52) U.S. Cl.
USPC .......................................... 477/5; 180/65.285

(58) Field of Classification Search
USPC .............. 477/3, 5; 180/65.28, 65.275, 65.285
See application file for complete search history.

(56) References Cited

U.S. PATENT DOCUMENTS

| | | | | |
|---|---|---|---|---|
| 4,335,429 A | * | 6/1982 | Kawakatsu | 701/102 |
| 5,993,351 A | * | 11/1999 | Deguchi et al. | 477/5 |
| 6,083,138 A | * | 7/2000 | Aoyama et al. | 477/5 |
| 6,083,139 A | * | 7/2000 | Deguchi et al. | 477/5 |
| 6,656,083 B2 | * | 12/2003 | Esaki | 477/5 |
| 6,976,934 B2 | * | 12/2005 | Komeda et al. | 477/5 |
| 7,110,867 B2 | * | 9/2006 | Imazu | 701/22 |
| 8,047,314 B2 | * | 11/2011 | Oba et al. | 180/65.265 |
| 8,234,025 B2 | * | 7/2012 | Conlon et al. | 701/22 |
| 2012/0083952 A1 | | 4/2012 | Smith et al. | |

OTHER PUBLICATIONS

Anonymous, "Breakthrough Lithium Polymer Batteries Leapfrog Existing Nickel-Metal Hydride and Lithium-Ion Technology", Hyundai Motor America—News Bureau, Mar. 31, 2010, Fountain Valley, CA, USA.

* cited by examiner

*Primary Examiner* — Roger Pang

(57) ABSTRACT

A powertrain includes a first electric motor coupled to an internal combustion engine with a ratio changing device and a second motor selectively coupled to the engine through an engine disconnect clutch, the second motor further coupled to an input shaft of a transmission. A method to control the powertrain includes monitoring a propelling torque provided by the second motor, monitoring a speed of the second motor, determining a condition of the second motor based upon the propelling torque and the speed of the second motor, selecting a control mode for the first motor based upon the condition of the second motor and controlling the first motor, the second motor, and the engine disconnect clutch based upon the control mode.

20 Claims, 3 Drawing Sheets

CONTROL OF A POWERTRAIN FOR A HYBRID SYSTEM

CROSS REFERENCE TO RELATED APPLICATIONS

This application claims the benefit of U.S. Provisional Application No. 61/388,555, filed on Sep. 30, 2010, which is incorporated herein by reference.

TECHNICAL FIELD

This disclosure is related to control of a hybrid drive powertrain.

BACKGROUND

The statements in this section merely provide background information related to the present disclosure. Accordingly, such statements are not intended to constitute an admission of prior art.

Hybrid drive powertrains are known including a plurality of torque generative devices. For example, a powertrain can include an internal combustion engine and an electric motor, and the engine and the motor can be controlled to increase an overall efficiency of the vehicle, for example, by utilizing the motor in operation efficient for the motor, utilizing the engine in operation efficient for the engine, utilizing both devices to cooperatively provide torque when such operation is efficient, and utilizing the motor to regenerate energy to an energy storage device, for example, during braking of the vehicle or by drawing torque from the engine.

In an exemplary configuration, the engine and the motor each provide a torque to the powertrain. In another exemplary configuration, the engine supplies a torque to the motor, and the motor in turn supplies a torque to the rest of the powertrain.

Shutting down the engine when it is not being used saves fuel that would be consumed by otherwise idling or running the engine at low speed. When the engine is shut down, a shaft leading from the engine to the powertrain will either cease turning, requiring the rest of the powertrain to adjust for the unmoving shaft, or the rest of the powertrain must supply a torque to turn the shut down engine, overcoming the torque (due to friction, cylinder pumping forces, etc.) required to turn the engine. A clutch device may be employed between the engine and the rest of the powertrain to permit the engine to remain shut down and remain stopped while the rest of the powertrain continues to function.

Clutch devices or clutches are used to selectively connect or disconnect shafts capable of transmitting torque. Clutches can be hydraulically actuated. An exemplary shift between states controlled by a pair of clutches requires that one clutch be unloaded, permitting two shafts that were previously coupled to spin freely of each other, and subsequently that another clutch be loaded, coupling two shafts that were formerly decoupled or free to spin relative to one another. Hydraulically actuated clutches frequently include clutch plates that are spring loaded to a default decoupled position, wherein hydraulic pressure applied to a piston applies pressure that overcomes the bias of the spring to bring the plates to a coupled position.

Engines can include a dedicated starter motor which supplies a torque to the engine in order to crank the engine during start. Torque to start the engine can be drawn from the powertrain or the associated motor of the powertrain. A hybrid drive powertrain can include a plurality of motors wherein one motor can be used to provide a torque to the rest of the powertrain to propel a vehicle, while the other motor can be used to start the engine.

SUMMARY

A powertrain includes a first electric motor coupled to an internal combustion engine with a ratio changing device and a second motor selectively coupled to the engine through an engine disconnect clutch, the second motor further coupled to an input shaft of a transmission. A method to control the powertrain includes monitoring a propelling torque provided by the second motor, monitoring a speed of the second motor, determining a condition of the second motor based upon the propelling torque and the speed of the second motor, selecting a control mode for the first motor based upon the condition of the second motor and controlling the first motor, the second motor, and the engine disconnect clutch based upon the control mode.

BRIEF DESCRIPTION OF THE DRAWINGS

One or more embodiments will now be described, by way of example, with reference to the accompanying drawings, in which.

DETAILED DESCRIPTION

Figure 1:
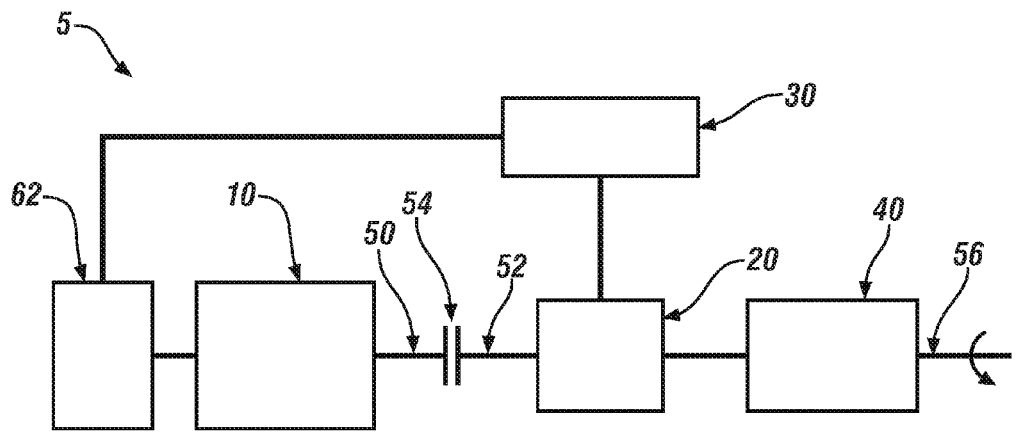
FIG. 1 illustrates an exemplary hybrid drive powertrain, in accordance with the present disclosure.

Referring now to the drawings, wherein the showings are for the purpose of illustrating certain exemplary embodiments only and not for the purpose of limiting the same, FIG. 1 illustrates an exemplary hybrid drive powertrain. Powertrain 5 includes engine 10, a first electric motor 62, a second electric motor 20, energy storage device 30 and transmission device 40. First electric motor 62 can be connected directly to the crankshaft of engine 10 or can be connected through a ratio changing device, such that a spin ratio of motor 62 can be changed with relation to the crankshaft. Many ratio changing devices are known in the art, with one exemplary embodiment including a pulley drive device. Engine output shaft 50 connects to motor input shaft 52 through clutch device 54. In one embodiment, clutch device 54 is referred to as an engine disconnect clutch (EDC), wherein selective activation of the clutch either enables the engine 10 to provide torque to motor 20 and the input shaft of transmission 40 or enables the engine 10 to spin or stop independently of motor 20. When clutch device 54 is in an engaged state and there is no slip within the clutch device, engine output shaft 50 spins at the same rate as motor input shaft 52, and torque can be transmitted between the engine 10 and the motor 20. When clutch device 54 is disengaged or is in a disengaged state, engine 10 can turn at a different rate from motor 20 or is isolated from motor 20, or engine 10 can be shut down without affecting operation of motor 20. When clutch device 54 is disengaged, motor 20 can be utilized to provide torque to output shaft 56 through transmission 40 independently of whether engine 10 is in an operating state or a shut down state. Engine 10 is illustrated as being directly connected to motor 20 through shafts 50 and 52 and clutch device 54. Clutch device 54 in one exemplary embodiment includes a hydraulically actuated clutch, to which hydraulic pressure can be controlled to vary torque capacity and varying levels of slip across the clutch device 54 can be enabled and controlled. It will be appreciated that a number of powertrain configurations are possible, for example, including use of planetary gear sets, to change the way in which engine 10 and motor 20 interact and provide torque to the powertrain 5. Clutch device 54 can exist between two shafts as illustrated in FIG. 1. Other embodiments are envisioned, for example, with transmission 40 including a braking clutch connected to a member of a planetary gear set and controlling how torque is transmitted through the planetary gear set to the output shaft 56. In another embodiment, a plurality of motors can provide torque to the output through the transmission while one or both are connected to the engine. A number of exemplary powertrain embodiments and configurations are envisioned to work with the present disclosure, and the disclosure is not intended to be limited to the particular exemplary embodiments provided herein.

Control modules can control operation of engine 10, motor 20, motor 62, transmission 40, and clutch device 54. Controls can be employed by the control modules synchronizing operation of the different devices in order to maintain drivability of the overall powertrain. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed based on events or at regular intervals, for example each 3.125, 6.25, 12.5, 25 and 100 milliseconds during ongoing engine and vehicle operation.

Operation of motors 20 and 62 can be selected according to a number of desired functions or control modes. The powertrain can operate in a parallel hybrid mode wherein torque from the engine 10 is transmitted to motor 20, and torque from motor 20 including torque provided by engine 10 is transmitted to the input shaft of transmission 40. Control modes of first motor 62 can include a drive mode, wherein torque is supplied from motor 62 to engine 10, and wherein clutch device 54 is engaged, such that torque provided by motor 62 increases torque applied to the input shaft of transmission 40. Another control mode of the first motor 62 can include a passive mode, wherein the motor is permitted to spin freely such that the engine 10 can generate torque with only minimal inertial load by motor 62. The powertrain can also operate in a series hybrid mode, wherein the engine 10 is used to generate electrical power that can be used by motor 20 to generate torque to transmit to the input shaft of transmission 40. In either series hybrid mode or parallel hybrid mode, first motor 62 can operate in a generator mode, wherein torque from engine 10 is used to turn first motor 62, and resulting electrical energy generated by first motor 62 is used to provide power to second electric motor 20. Additionally or alternatively, first motor 62 can operate in a battery recharge mode, wherein torque from engine 10 is used to turn first motor 62, and resulting electrical energy generated by first motor 62 is used to increase a state of charge of an energy storage device utilized by the powertrain. In parallel hybrid mode, either a first motor to second motor torque generation split or a first motor to second motor torque regeneration split can be determined according to methods disclosed herein to assign torque between the motors. According to one exemplary embodiment, a total torque to be assigned between the motors, either a propelling torque or a braking torque, is known, and based upon the speed of each of the motors, the efficiency of each motor is determined across a range of torque values and the total torque is divided based upon a highest or preferred overall efficiency of both motors.

In addition to being used in the modes related to parallel or series hybrid modes of operation, motor 62 can be used for other functions. For example, motor 62 can be used to perform an engine start or a flying engine start, wherein the vehicle is moving and the engine must be brought into a state wherein clutch device 54 can be engaged. First motor 62 can include a first motor only engine start mode, wherein motor 62 provides an entirety of torque required to start engine 10 from a stopped state. According to one embodiment, a first motor only engine start mode can be selected based upon comparing a propelling torque being provided by the second motor to a maximum torque of the second motor and determining that the second motor has insufficient excess capability to aid in the engine start. Another control mode of first motor 62 can include a two motor cooperative engine start mode, wherein torque from motor 62 and torque transmitted through clutch device 54 are used to start the engine. A cooperative engine start mode can similarly include a flying engine start of a two motor cooperative flying engine start mode. A two motor cooperative flying engine start mode can be selected, for example, by comparing a propelling torque provided by the second motor to a maximum torque of the second motor and determining that the second motor has sufficient excess capability to aid in the engine start. Another control mode of first motor 62 can include a regeneration mode, wherein torque transmitted through clutch device 54, for example, reactive torque being transmitted in response to motor 62 applying a braking torque to slow the input shaft and attached driveline, is used to turn first motor 62, and resulting electrical energy generated by first motor 62 is used to provide power to second electric motor 20 and/or recharge an energy storage device. A number of control modes for the first motor 62 are envisioned, and the methods disclosed are not limited to the particular examples herein.

Selection of a control mode for first motor 62 can be made based upon a number of factors, including operation of the powertrain and driver commands such as an operator torque request indicated by an accelerator or brake pedal position. In some circumstances, a maximum or defined performance is required of the first motor 62 and the second motor 20. For example, operating as a series hybrid, the second motor 20 provides a speed and torque defined by desired operation of the transmission and attached drivetrain, and the first motor 62 operates in a selected state based upon the engine 10 operating at a selected condition to generate electrical energy through motor 62. However, under other circumstances, first motor 62 and second motor 20 are controlled cooperatively to provide a desired torque less than a sum of the maximum torques that the motors can generate. In one example, to generate a braking torque each of the first motor 62 and second motor 20 can operate in a regeneration mode, with each motor supplying a portion of the total desired braking torque. In another example, in cooperative engine start mode, each of first motor 62 and second motor 20 can provide a portion of a desired engine cranking torque.

In some modes, the first motor 62 and the second motor 20 each can be assigned a portion of a function, and the motors collectively provide the necessary capacity for the function. For example, in an engine start, a required cranking torque for the engine $T_{E\_CRANK}$ can be divided between the motors. In another example, it may be preferable that one of the motors provide the entirety of the required cranking torque. A method to select a control mode of the first motor 62 and to assign a total required torque between the first motor 62 and the second motor 20 based upon operation or a condition the second motor 20 is disclosed.

A number of parameters can be used to determine a condition of the second motor 20. Parameters illustrative of the condition of the second motor can include torque, speed, and motor efficiency.

Torque of the second motor can be used to determine a mode for the first motor and assign torque to the first motor 62 and the second motor 20. Torque requirements of the second motor 20 can affect the assignment of torque between motor 62 and motor 20. For example, motor 20 can be required to supply some or all of the required torque to the input shaft of transmission 40 based upon the required output torque. Assignment of torque or used of different modes of first motor 62 can be made based upon torque, for example, by comparison to a maximum torque of second motor 20. According to one method to use motor 20 to execute a flying start of engine 10, control of motor 20 must include a constant buffer against the maximum torque of motor 20, constantly reducing a torque that motor 20 can transmit to the input shaft in case engine 10 needs that torque buffer to immediately start. If the torque generated by motor 20 to provide the required torque to the transmission is low, such that maintaining the buffer required to be able to supply a cranking torque at any time does not affect the motor's ability to provide the required torque to the transmission, then motor 20 can be eligible to supply most or all of the cranking torque required to start engine 10. If the torque generated by motor 20 to provide the required torque to the transmission is high, such that maintaining the buffer required to be able to supply a cranking torque at any time affects the motor's ability to provide the required torque to the transmission or impinges upon a desired reserve torque that is advantageous to save if the driver requests additional torque, then motor 20 can be disqualified from supplying some or all of the cranking torque required to start engine 10. In one embodiment, first motor 62 can be operated in a first motor increased contribution mode, for example, a first motor increased contribution flying engine start mode, based upon limited capabilities of the second motor to instantaneously provide torque. In one embodiment, a first motor increased contribution flying engine start mode can be used to preserve an ability of the second motor to provide a desired output torque or desirable available output torque or preserve an ability of the vehicle to maintain a desired vehicle maximum speed. Operation of an electric motor can include a torque limited region, wherein the motor is limited to supplying no more than a maximum torque, and power limited region, wherein the motor must balance a torque that it can provide with the speed at which it is spinning A determination can be made based upon the motor speed and torque whether or how much additional torque the motor can efficiently provide. Based upon this determination, a mode for the first motor can be selected. Further, a determination can be made to avoid assigning torque to a motor causing the motor to operate inefficiently with respect to power limited operation. For example, when a potential or candidate control mode for the first motor is identified, a determination can be made whether the candidate mode would cause the second motor to operate inefficiently, for example, as caused by extending the motor into a power limited region.

Similarly, a speed of motor 20 can affect assignment of torque between motor 62 and motor 20. In one example, if the second motor 20 is providing torque to the input shaft of transmission 40 while the vehicle or powertrain is operating in a creep mode (i.e. progressing under power at a small forward speed), the speed of motor 20 may be too low for the engine 10 to synchronize with motor 20, causing the engine to go below a minimum speed. In such a case, operating in a mode requiring torque to be transmitted between the engine 10 and the second motor 20 can be difficult, for example, requiring controlled slipping of the engine disconnect clutch 54, or impossible. Therefore, either a first motor only flying engine start mode or operation of the powertrain in a series hybrid mode with the first motor operating in a generator mode might be preferable when the vehicle is operating in a creep mode. In another embodiment, second motor 20 can be used only briefly to provide an initial portion of the torque needed to get engine 10 initially moving, with the engine disconnect clutch 54 operating with controlled slip, and then quickly changing to a first motor only flying engine start mode.

Efficiency of operating a particular electric motor at various torques and speeds is a knowable property of an electric motor, for example, quantifying electrical power consumed or generated for a given motor torque, that can be used as a parameter to determine a mode for the first motor and assign torque between the first motor and the second motor. Efficiency of the second motor can be analyzed or a comparison of efficiency of two electric motors can be made. For example, if a regeneration or braking torque needs to be assigned between the two motors, if first motor 62 is smaller in capacity than second motor 20, at a given speed and torque, motor 20 can be more efficient in regeneration mode than motor 62. In such an example, braking torque generated by motor 20 can be maximized at the higher efficiency before a remaining portion of the braking torque is assigned to motor 62. In another exemplary embodiment, a series or parallel hybrid mode can be selected based upon comparing the resulting efficiencies of the modes. In another exemplary embodiment, it can be preferable to maintain control over the speed of a fully or partially disconnected engine through the braking event, such that operation of the vehicle in a normal propulsion mode under engine power can be quickly recovered if the braking mode abruptly ends. In such a condition, the entirety of the regeneration can be performed by the second motor, with the first motor operating in an engine spin control mode.

Desirable performance of the vehicle can be used as a parameter to determine a mode for the first motor and assign torque between the first motor and the second motor. For example, a desired vehicle maximum speed or a desired acceleration capability of the vehicle can be protected, with the mode selection and assignment of torque between the motors preserving the ability of the vehicle to perform as desired. In one embodiment, preserving the ability of the vehicle to perform can include selecting a mode and assigning torque based upon a desirable available output torque, for example, including a current output torque and/or an output torque buffer that must be preserved.

Other parameters illustrating a condition of the second motor or the two motors can be used to determine a mode for the first motor and resulting torque assignment between the two motors, for example, including parameters affecting drivability concerns or perceptible effects to vehicle acceleration, noise concerns, durability concerns for the vehicle components or systems involved, and predictable vehicle operation through a forecasted time period. In one example, the second motor can be operated in a low torque disturbance mode, minimizing any effects to drivability, and any other functions such as operation of a flying engine start can be operated entirely by the first motor. In such an embodiment, the first motor can additionally be utilized to synchronize the engine to the second motor with minimal torque disturbance. A number of parameters illustrating a condition of the motors are envisioned, and the disclosure is not intended to be limited to the particular embodiments provided.

Motor configurations for the first motor 62 and the second motor 20 can include substantially equivalent motors, each capable of providing same or similar motor torque and speed characteristics. In another embodiment, the motors can be selected for their specific anticipated roles. For example, second motor 20 can be a relatively large or high capacity motor, capable of providing an entirety of propulsion torque for the powertrain, while first motor 62 can be a relatively small or low capacity motor, for example, being capable of only providing a portion of the total torque required to crank the engine. Such capacities and associated operating characteristics of the motors can be used to select or limit selection of different modes for the first motor.

The first motor 62 can be connected to the engine 10 with a ratio changing device, permitting first motor 62 to spin at a different speed than engine 10. Gear sets or other devices can be used. In one embodiment, a pulley drive device can be utilized.

The second motor 20 can provide torque to the input shaft of transmission 40 while torque is being transmitted through the engine disconnect clutch 54. Drivability can be adversely affected by abruptly engaging an engine disconnect clutch to a motor already providing torque to a transmission. The second motor, based upon a motor torque command, draws an amount of power from an associated energy storage device corresponding to the torque that the motor is expected to provide to the transmission. Engaging the engine disconnect clutch while the motor continues to draw the same amount of power results in the same torque output by the motor being divided between the transmission and the engine. For a desired mode, for example a parallel hybrid configuration, a torque profile can be determined or estimated to predict how much torque will be transmitted through the engine disconnect clutch. In the example of a flying engine start, a desired engine activation speed profile can be determined for a particular flying engine start, such that expected operation of the engine through the engine start can be determined. Controlling a powertrain through a flying engine start can include determining a motor torque required to provide desired torque to the transmission, determining a motor torque that will be required by the engine disconnect clutch providing the necessary cranking torque to the engine to execute the flying engine start, and controlling the motor by summing the motor torque that will be required by the engine disconnect clutch providing the necessary torque to the engine and the motor torque required to provide desired torque to the transmission.

A flying engine start can include an engine initially disconnected from the powertrain via a disengaged EDC and not rotating (i.e. zero speed). Through the course of a flying engine start, a previously disconnected engine is accelerated from an initial speed of zero to a speed that is synchronous with a speed of another shaft or a synchronous speed ($N_{e\_synch}$), such that a clutch connecting the engine to the other shaft can be locked and the engine can provide torque to the rest of the powertrain. In one embodiment, wherein the clutch is matching an engine speed to an input speed, the $N_{e\_synch}$ value that the engine must match is the input speed. If the speed to be matched is a dynamic profile, for example, an accelerating input speed, then $N_{e\_synch}$ must be determined based upon factors affecting operation of the powertrain. One exemplary factor is a capability of the engine to accelerate from a stop to a given speed with acceptable parameters. For a given input speed profile and an engine with known properties, $N_{e\_synch}$ can be determined through calibration, calculation, modeling or any method sufficient to accurately predict operation of the engine, clutch, and remainder of the powertrain, and a number of calibration curves or prediction modifiers can be utilized for different conditions and operating ranges.

A flying engine start can include starting the engine 10 and transitioning from the shut down state to an operating state while the motor 20 is providing torque to the transmission 40. According to one exemplary embodiment, a flying engine start can be accomplished by engaging clutch device 54, thereby supplying torque from motor device 20 to engine 10 and rotating engine 10 such that the combustion cycle can begin.

According to one embodiment, a flying engine start can include applying torque to an engine through an EDC including closed-loop control of the EDC, for example, based upon comparing an actual engine speed to an engine speed profile for the flying engine start, to ensure controllability of the clutch and open-loop control of the EDC with P-I curve adaptation based upon a solenoid current and clutch pressure feedback at steady state. Testing, estimating, or modeling EDC clutch pressure through a flying engine start can be used to determine a required motor torque necessary to compensate for engine load upon the EDC or a motor compensation torque while spinning the engine. In one embodiment, cranking torque required to spin the engine through the flying engine start, for example, as can be determined through testing, estimation or modeling, can be used to determine or estimate a compensation torque required to supply the torque required to spin the engine. Determining the compensation torque can include using a clutch pressure-torque model to estimate a reaction torque in the EDC. Further, a pressure-torque compensation model can be used to compensate for nonlinearity, time lag and temperature effects present in hydraulic pressure measurement. In one embodiment, open-loop EDC torque can be controlled based upon a feed-forward calculation of engine inertia torque, friction, and compression torque. Engine inertia torque can be calculated based upon a calibrated engine acceleration profile. In one embodiment, propulsion torque can be further controlled or smoothed using modulated pressure to a transmission output clutch. Slipping the transmission output clutch isolates the downstream driveline from oscillations which occurs due to imperfectly compensated disturbance during flying engine start event, permitting slip when torque applied to the transmission output clutch goes above a selected value.

Figure 2:
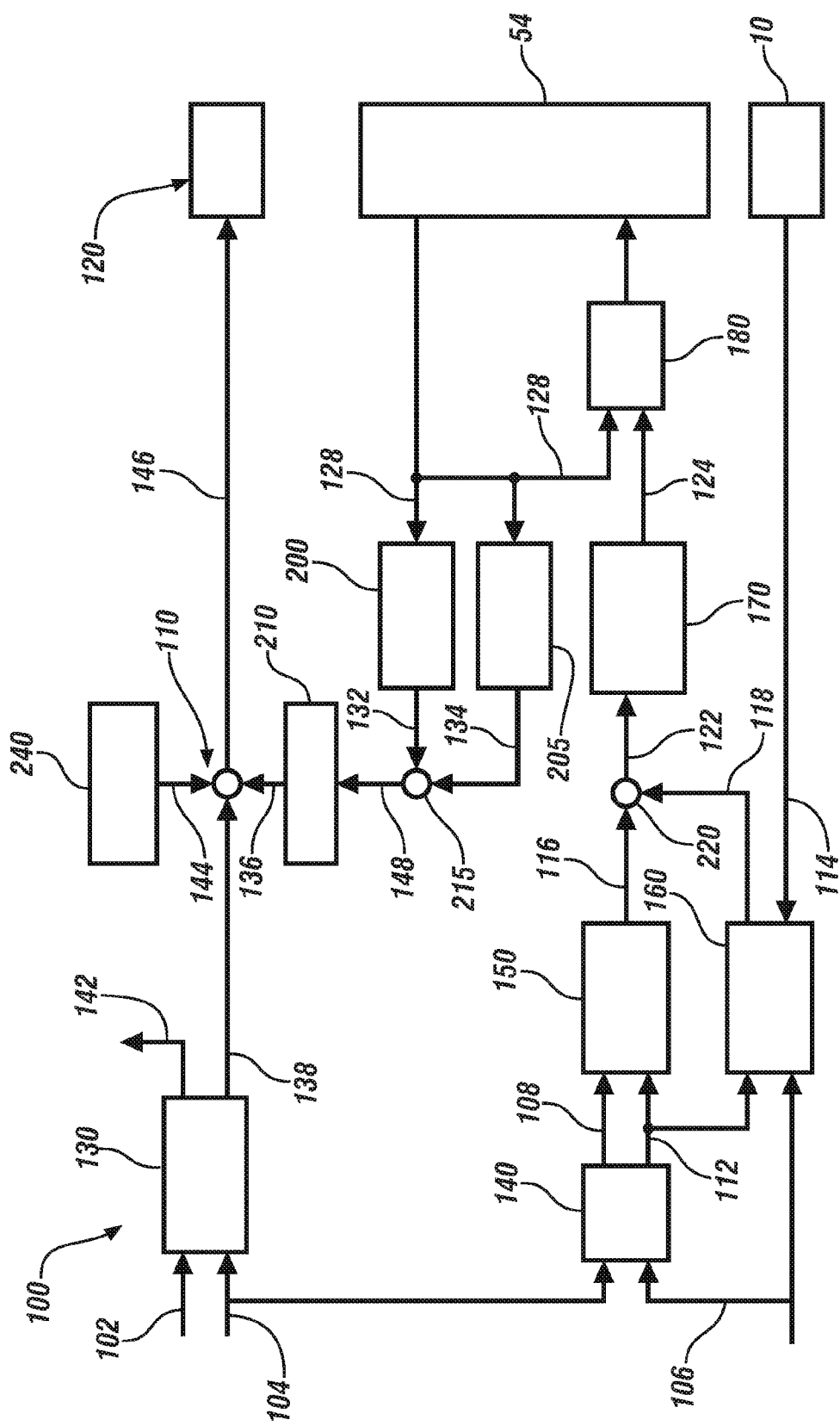
FIG. 2 illustrates an exemplary control module for executing a flying engine start, in accordance with the present disclosure.

FIG. 2 schematically illustrates an exemplary control module for executing a flying engine start. Flying engine start control module 100 includes summation block 110, which sums a motor torque required to propel the driveline or propulsion torque ($T_{m\_propel}$) 138 and required motor torque necessary to compensate for engine load upon the EDC through a flying engine start or motor compensation torque ($T_{m\_comp}$) 136 and outputs a motor torque command ($T_{m\_cmd}$) 146 to motor inverter 120 controlling an associated motor. Flying engine start control module 100 can additionally include driveline active damping control module 240 providing signal 144 based upon reducing torque variation in the output torque to summation module 110. Control module 100 can receive an input from the engine control module regarding required engine torque generation, or control module 100 can directly compute the required engine torque generation.

The illustrated flying engine start control module 100 determines a number of terms in support of $T_{m\_comp}$ 136. Engine speed profiling module 140 determines an engine speed profile for the flying engine start including a desired engine acceleration ($N_{edot\_ref}$) 108 and a desired engine speed ($N_{e\_ref}$) 112 based upon an actual engine speed 106 and a current output speed of the transmission output or current output speed 104. $N_{edot\_ref}$ 108 and $N_{e\_ref}$ 112 are used in open-loop EDC torque control module 150 to determine an open-loop EDC torque control term 116 or open-loop clutch control term. $N_{e\_ref}$ 112, actual engine speed 106, and actual engine torque 114 are used in closed-loop EDC slip control module 160 to determine a closed-loop EDC torque control term 118 or closed-loop clutch control term. Wherein torque from second motor 20 is to be balanced or is subject to a split torque command with a torque from first motor 62, open-loop EDC torque control module 150 and/or closed-loop EDC slip control module 160 can include an input defining that balance. Whether the balancing input is required by the open-loop or closed-loop calculation depends upon the nature of the torque command being divided and how the system is intended to respond to closed-loop correction of the command. According to one embodiment, wherein a precise engine speed is being controlled by cooperating control of the two motors, second motor 20 can be controlled with an open-loop control in order to maintain smooth torque transmission to the transmission 40 and first motor 62 can be controlled with an open-loop control and can additionally maintain closed-loop commands to make fine adjustments to the engine speed. In this example, open-loop commands to first motor 62 and second motor 20 are controlled by a first motor to second motor torque generation split, determined by methods disclosed herein. By regulating control of EDC 54, transmission of changes to torque applied by first motor 62 to engine 10 can be filtered from impacting torque transmitted to transmission 40. Open-loop EDC torque control term 116 and closed-loop EDC torque control term 118 are summed in summation module 220, forming an EDC torque command 122. EDC torque command 122 is converted based upon torque and pressure properties of the EDC in module 170 to determine EDC pressure command 124. EDC pressure command 124 is compared to an actual EDC pressure 128 within closed-loop pressure regulation module 180. Actual EDC pressure 128 can be a measured value such as can be measured by a pressure transducer or actual EDC pressure 128 can be an estimated value. Closed-loop pressure regulation module 180 uses the difference to control EDC 54. EDC 54 can exist as a separate device in the powertrain. In one embodiment, EDC 54 can be a part of and/or be controlled with the transmission. Actual EDC pressure 128 is used by clutch pressure-torque model 200 to estimate a reaction torque 132 in the EDC 54. Further, pressure-torque compensation model 205 uses actual EDC pressure 128 to determine torque compensation value 134 for nonlinearity, time lag and temperature effects. Reaction torque 132 and torque compensation value 134 are summed in summation module 215 to form EDC torque estimate 148. Clutch torque compensation module 210 uses EDC torque estimate 148 to determine $T_{m\_comp}$ 136. Propulsion torque control module 130 monitors current output speed 104 and output torque request 102 to determine engine torque command 142 and $T_{m\_propel}$ 138. Summation module 110 sums $T_{m\_comp}$ 136, $T_{m\_propel}$ 138, and signal 144 to determine $T_{m\_cmd}$ 146 for controlling the motor or motors of the vehicle. Flying engine start control module 100 provides an exemplary embodiment of a control module to execute the methods disclosed, however, it will be appreciated that a number of different embodiments of control modules can be utilized, and the disclosure is not intended to be limited to the exemplary embodiment disclosed herein.

Hydraulic pressure to the EDC or other clutches can be a function of controlling a main hydraulic pump, frequently associated with the input speed of the transmission, and an auxiliary pump. Control of the main and auxiliary pumps and the hydraulic pressure delivered to the system controlling clutches can including monitoring discharge pressures of one or the other pump and regulating pressure to the system accordingly. Clutches include clutch fill events, wherein a clutch is rapidly filled to a point where it is ready to begin applying pressure to the associated clutch pads or the touch-point of the clutch. Such a point can be referred to the point of incipient torque in the clutch.

According to one embodiment of a flying engine start, the flying engine start can be divided into four stages, stages A through D. Stage A is an engine cranking stage, where an engine torque command is zero and torque from one or both of the electric motors applied to spin up the engine. In one embodiment, a motor torque command to the second motor is augmented to compensate for the engine disconnect clutch torque based on an EDC clutch torque estimate. In Stage B, the engine has fired and engine torque commands are used to bring the engine speed close-to synchronization with the second motor in open-loop control mode. Control of the first motor can be used to assist the engine during stage B, or the first motor can be commanded to spin freely. Along with the open-loop control of the engine torque, the engine disconnect clutch is under closed-loop slip control to reach a desired EDC speed differential between the engine speed and the speed of the second motor and the associated transmission input speed. In Stage C, the engine speed is close to the transmission input speed and EDC speed differential or EDC slip is reduced to the minimum desired level through clutch slip control with most torque to control the engine speed being provided by one or both of the motors with minimal engine torque commanded. This is intended to minimize engine torque torsional disturbances on the driveline as the engine disconnect clutch locks up. In Stage D, the engine disconnect clutch is locked and the engine torque is ramped up as motor torques are ramped down, thus completing the engine start sequence. Control of a powertrain through such a flying engine start is disclosed in co-pending and commonly assigned U.S. patent application Ser. No. 13/216,311, which is incorporated herein by reference.

Figure 3:
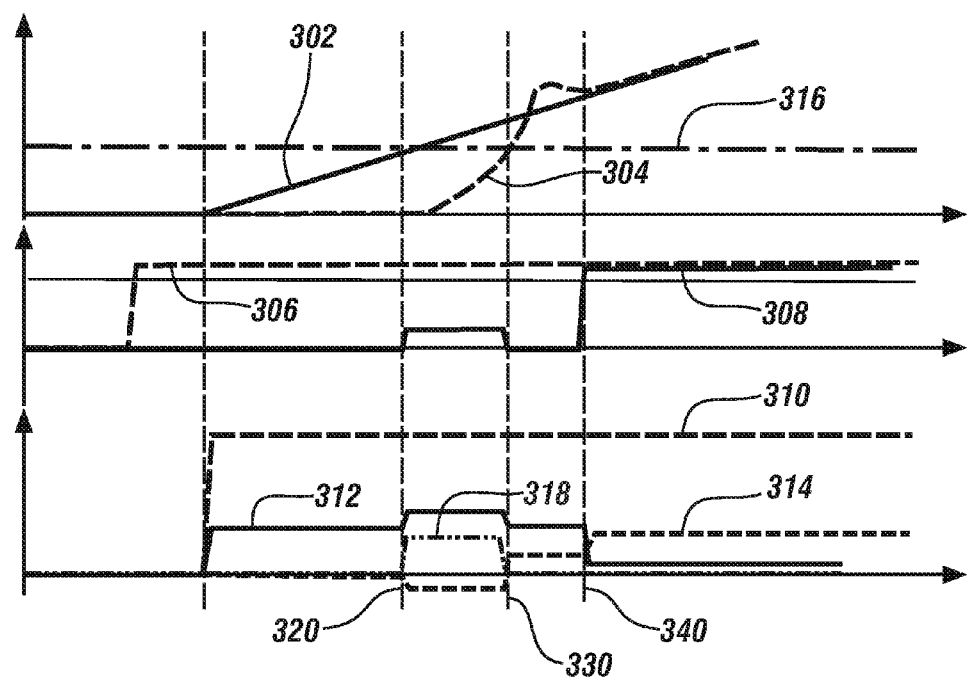
FIG. 3 illustrates an exemplary flying engine start including utilizing torque from a first and a second motor, in accordance with the present disclosure.

FIG. 3 graphically illustrates an exemplary flying engine start including utilizing torque from the engine to achieve a synchronization speed and using motor 62 to assist motor 20 with the flying engine start. In a top portion of the figure, a horizontal axis illustrates a time period in seconds and a vertical axis illustrates shaft speed in revolutions per minute. An input speed 302 and an engine speed 304 are illustrated. In a central portion of the figure, a horizontal axis corresponds to the same time period as illustrated in the top portion and a vertical axis illustrates clutch engagement. Transmission output clutch 306 and EDC 308 are illustrated. In a bottom portion of the figure, a horizontal axis corresponds to the same time period as illustrated in the top portion, and a vertical axis illustrates torque. Output torque 310, torque 312 for second motor 20, torque 318 for first motor 62, and engine torque 314 are illustrated. Input speed 302 accelerates from zero at a constant rate. Transmission output clutch 306 is initially set to a fully engaged state and maintained at that state. Output torque 310 is set to a value and maintained. In a period starting when the input speed 302 begins to accelerate, motor torque 312 is set to a value to generate output torque 310. For a period after input 302 begins to accelerate, the engine speed 304 remains at zero and the EDC 308 remains in a disengaged state. At time 320, stage A of a flying engine start is initiated. EDC 308 changes to a slip state, wherein motor torque 312 can be utilized to provide torque to the engine while the engine speed 304 and the input speed 302 remain different values. At time 320, engine speed 304 begins to accelerate, and motor torques 312 and 318 increase in order to provide torque to the engine while maintaining output torque 310. Torque 318 is controlled to provide additional torque from motor 62, aiding acceleration of the engine. Torque 318 can be controlled based upon calibrated behavior of the powertrain or other inputs. At time 330, engine speed 304 achieves an engine firing speed 316, and stage B of the flying engine start can be initiated. At time 330, the engine can be fired and made operational, providing an engine torque and accelerating the engine speed 304 based upon an engine speed profile selected to achieve $N_{e\_synch}$. EDC 308 can be reduced to a minimum level, motor torque 318 can be reduced to zero, and motor torque 312 returns to a level maintaining the output torque 310 without providing any torque to the engine. In FIG. 9, at time 535, stage C of the flying engine start is initiated. In FIG. 11, a method is illustrated wherein stage C is omitted from the flying engine start, and instead engine torque 314 is utilized to achieve $N_{e\_synch}$ through an extended stage B. Once $N_{e\_synch}$ is achieved at time 340, stage D of the flying engine start is initiated, and the EDC 308 can be fully engaged.

Figure 4:
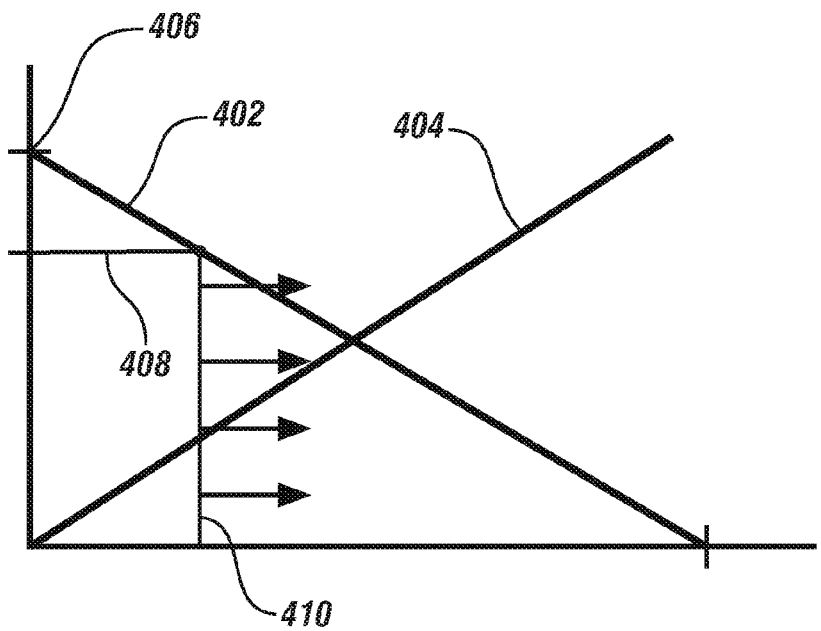
FIG. 4 illustrates torque from a first motor and torque from a second motor cooperatively being used to provide a desired torque, in accordance with the present disclosure.

Modes are disclosed wherein first motor 62 and second motor 20 can cooperatively provide a required torque, for example, a desired cranking torque required to start the engine 10. FIG. 4 graphically illustrates two motors cooperatively providing a desired torque. A horizontal axis illustrates a first motor to second motor torque generation split, determined according to methods disclosed, with values increasing from left to right illustrating increased contribution by the second motor and decreased contribution by the first motor. A vertical axis illustrates torque transmitted by the motors. One having skill in the art will appreciate that torque transmitted by the motor to a desired shaft, for example, the crankshaft of the engine can be different than the torque generated by the device, for example, as a result of a ratio changing device, losses in an engine disconnect clutch, or the transmitted torque only including a portion of the torque generated by a motor. Plot 402 illustrates torque transmitted by the first motor as a contribution to the desired torque, and plot 404 illustrates torque transmitted by the second motor as a contribution to the desired torque. Value 406 on the vertical axis illustrates a total desired torque required of the motors. For any horizontal axis value, the value of plot 402 and plot 404 equal value 406. As disclosed, in some embodiments, a motor can be used that cannot by itself deliver a desired torque. Additionally, if the motor is already providing some other torque, is controlled to remain under a particular torque, for example, as a result of determined efficiency values, or is required to maintain a torque reserve, a maximum torque that can be transmitted by the motor can be defined. In the embodiment of FIG. 4, a maximum torque that can be transmitted by the first motor is defined by value 408. As a result, a corresponding first motor to second motor torque generation split value 410 can be defined limiting the split between the first motor and the second motor. Because of value 408, the first and second motor cannot be commanded to operate in the region to the left of value 410.

Figure 5:
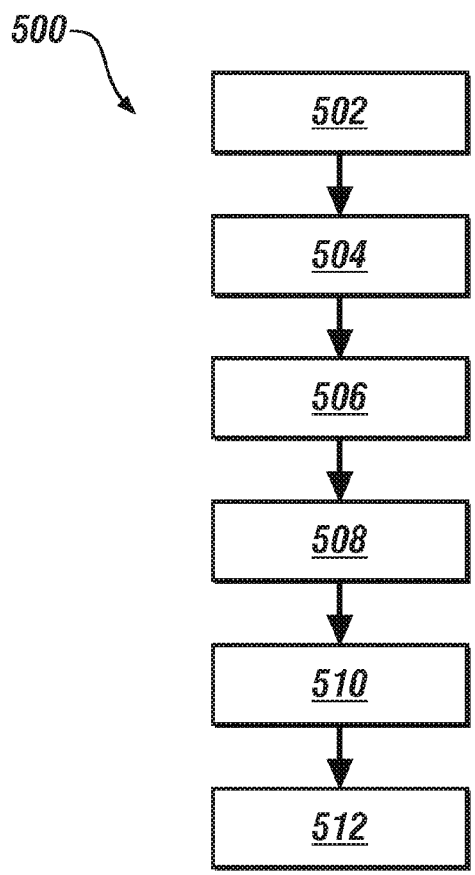
FIG. 5 illustrates an exemplary process for executing a flying engine start, in accordance with the present disclosure.

FIG. 5 illustrates an exemplary process for controlling a first and second motor of a powertrain. Table 1 is provided as a key wherein the numerically labeled blocks and the corresponding functions are set forth as follows.

TABLE 1

| BLOCK | BLOCK CONTENTS |
|---|---|
| 502 | Start |
| 504 | Monitor a Torque Provided by the Second Motor |
| 506 | Monitor a Speed of the Second Motor |
| 508 | Determine a Condition of the Second Motor Based Upon the Torque and Speed |
| 510 | Select a Control Mode for the First Motor Based upon the Condition of the Second Motor |
| 512 | Control the First Motor and the Second Motor Based upon the Control Mode |

Process 500 begins at block 502. At block 504, a torque provided by the second motor is monitored. At block 506, a speed of the second motor is monitored. In block 508, a condition of the second motor is determined based upon the torque and the speed. At block 510, a control mode for the first motor is selected based upon the condition of the second motor. At block 512, the first and second motors are controlled based upon the control mode. Variations on process 500 are possible, for example, alternative or additional parameters monitored or determined in support of determining the condition of the second motor. Additionally, an engine disconnect clutch and/or the engine can be controlled based upon the control mode. A number of exemplary processes to control the powertrain are envisioned, and the disclosure is not intended to be limited to the particular exemplary embodiments provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a powertrain comprising a first electric motor coupled to an internal combustion engine with a ratio changing device and a second motor selectively coupled to the engine through an engine disconnect clutch, the second motor further coupled to an input shaft of a transmission, the method comprising:
   monitoring a propelling torque provided by the second motor to the input shaft;
   monitoring a speed of the second motor;
   determining a condition of the second motor based upon the propelling torque and the speed of the second motor;

selecting a control mode for the first motor based upon the condition of the second motor;
when the selected control mode for the first motor comprises activating a flying engine start:
monitoring a cranking torque required for the flying engine start; and
determining a proportion of the cranking torque to be provided by the first motor based upon the condition of the second motor; and
controlling the first motor, the second motor, and the engine disconnect clutch based upon the control mode, wherein the first motor, the second motor, and the engine disconnect clutch are controlled based upon the determined proportion of the cranking torque when the selected control mode for the first motor comprises activating the flying engine start.

2. The method of claim 1, wherein activating the flying engine start comprises activating a first motor increased contribution flying engine start based upon a desirable available output torque.

3. The method of claim 1, wherein selecting the control mode for the first motor comprises activating a series hybrid mode based upon the second motor operating in a creep mode.

4. The method of claim 1, wherein determining the condition of the second motor comprises determining an efficiency of operating the powertrain in a series hybrid mode;
wherein selecting the control mode for the first motor comprises activating a series hybrid mode based upon the determined efficiency.

5. The method of claim 1, further comprising:
operating the powertrain in a parallel hybrid mode; and
wherein selecting the control mode for the first motor comprises determining a first motor to second motor torque generation split.

6. The method of claim 1, further comprising:
operating the powertrain in a parallel hybrid mode; and
wherein selecting the control mode for the first motor comprises determining a first motor to second motor torque regeneration split.

7. The method of claim 1, further comprising utilizing the second motor in a regeneration mode; and
wherein selecting the control mode for the first motor comprises activating an engine spin control mode for the first motor.

8. The method of claim 7, wherein the engine disconnect clutch is fully disengaged.

9. The method of claim 7, wherein the engine disconnect clutch is partially disengaged.

10. The method of claim 1, wherein determining the condition of the second motor comprises determining the second motor to be operating in a power limited region.

11. The method of claim 1, wherein determining the condition of the second motor comprises determining whether a candidate control mode for the first motor would cause the second motor to operating in a power limited region.

12. The method of claim 1, wherein controlling the second motor comprises:
monitoring an output torque request;
determining a propelling torque required to be supplied to the input shaft based upon the output torque request;
determining a compensation torque required to be supplied to the engine disconnect clutch based upon the mode of the first motor; and
commanding the second motor to generate torque according to the sum of the propelling torque and the compensation torque.

13. Method to control a powertrain comprising a first electric motor coupled to an internal combustion engine with a ratio changing device and a second motor selectively coupled to the engine through an engine disconnect clutch, the second motor further coupled to an input shaft of a transmission, the method comprising:
monitoring a propelling torque provided by the second motor;
monitoring a speed of the second motor;
determining a condition of the second motor based upon the propelling torque and the speed of the second motor;
selecting a control mode for the first motor based upon the condition of the second motor, wherein selecting the control mode for the first motor comprises activating a first motor only flying engine start based upon comparing the propelling torque of the second motor to a maximum torque of the second motor; and
controlling the first motor, the second motor, and the engine disconnect clutch based upon the control mode.

14. Method to control a powertrain comprising a first electric motor coupled to an internal combustion engine with a ratio changing device and a second motor selectively coupled to the engine through an engine disconnect clutch, the second motor further coupled to an input shaft of a transmission, the method comprising:
monitoring a propelling torque provided by the second motor;
monitoring a speed of the second motor;
determining a condition of the second motor based upon the propelling torque and the speed of the second motor;
selecting a control mode for the first motor based upon the condition of the second motor, wherein selecting the control mode for the first motor comprises activating a two motor cooperative flying engine start based upon comparing the propelling torque of the second motor to a maximum torque of the second motor; and
controlling the first motor, the second motor, and the engine disconnect clutch based upon the control mode.

15. Method to control a powertrain comprising a first electric motor coupled to an internal combustion engine with a ratio changing device and a second motor selectively coupled to the engine through an engine disconnect clutch, the second motor further coupled to an input shaft of a transmission, the method comprising:
monitoring a propelling torque provided by the second motor;
monitoring a speed of the second motor;
determining a condition of the second motor based upon the propelling torque and the speed of the second motor;
selecting a control mode for the first motor based upon the condition of the second motor, wherein selecting the control mode for the first motor comprises activating a first motor increased contribution flying engine start based upon a desired vehicle maximum speed; and
controlling the first motor, the second motor, and the engine disconnect clutch based upon the control mode.

16. Method to control a powertrain comprising a first electric motor coupled to an internal combustion engine with a ratio changing device and a second motor selectively coupled to the engine through an engine disconnect clutch, the second motor further coupled to an input shaft of a transmission, the method comprising:
monitoring a propelling torque provided by the second motor;
monitoring a speed of the second motor;
determining a condition of the second motor based upon the propelling torque and the speed of the second motor;

selecting a control mode for the first motor based upon the condition of the second motor, wherein selecting the control mode for the first motor comprises:
  activating a first motor only flying engine start based upon the second motor operating in a low torque disturbance mode; and
  operating the engine disconnect clutch in a disengaged state based upon the second motor operating in the low torque disturbance mode; and
controlling the first motor, the second motor, and the engine disconnect clutch based upon the control mode.

17. The method of claim 16, further comprising:
after the engine is started, utilizing the first motor to synchronize the engine to the second motor; and
engaging the engine disconnect clutch after the engine is synchronized to the second motor.

18. Method to control a powertrain comprising a first electric motor coupled to an internal combustion engine with a ratio changing device and a second motor selectively coupled to the engine through an engine disconnect clutch, the second motor further coupled to an input shaft of a transmission, the method comprising:
monitoring a propelling torque provided by the second motor;
monitoring a speed of the second motor;
determining a condition of the second motor based upon the propelling torque and the speed of the second motor;
selecting a control mode for the first motor based upon the condition of the second motor, wherein selecting the control mode for the first motor comprises activating a first motor only flying engine start based upon a speed of the second motor being too low to support the engine start; and
controlling the first motor, the second motor, and the engine disconnect clutch based upon the control mode.

19. Method to control a powertrain comprising a first electric motor connected to an internal combustion engine with a pulley drive device and a second motor connected to the engine through an engine disconnect clutch, the second motor further connected to an input shaft of a transmission, the method comprising:
providing propelling torque to the input shaft with the second motor;
monitoring a speed of the second motor;
determining a condition of the second motor based upon the propelling torque and the speed of the second motor; and
operating a flying engine start based upon the condition of the second motor, comprising:
  monitoring a cranking torque required for the flying engine start;
  determining a proportion of the cranking torque to be provided by the first motor based upon the condition of the second motor; and
  controlling the first motor, the second motor, and the engine disconnect clutch based upon the determined proportion.

20. System to control a powertrain comprising a first electric motor connected to an internal combustion engine with a ratio changing device and a second motor connected to the engine through an engine disconnect clutch, the second motor further connected to an input shaft of a transmission, the system comprising:
the first motor;
the second motor providing torque to the input shaft;
the engine disconnect clutch; and
a control module:
  monitoring a torque provided by the second motor to the input shaft;
  monitoring a speed of the second motor;
  determining a condition of the second motor based upon the propelling torque and the speed of the second motor;
  selecting a control mode for the first motor based upon the condition of the second motor;
  when the selected control mode for the first motor comprises activating a flying engine start:
    monitoring a cranking torque required for the flying engine start; and
    determining a proportion of the cranking torque to be provided by the first motor based upon the condition of the second motor; and
controlling the first motor, the second motor, and the engine disconnect clutch based upon the control mode, wherein the first motor, the second motor, and the engine disconnect clutch are controlled based upon the determined proportion of the cranking torque when the selected control mode for the first motor comprises activating the flying engine start.

* * * * *